(12) United States Patent
Fu

(10) Patent No.: US 12,670,351 B1
(45) Date of Patent: Jun. 30, 2026

(54) COMPOSITE TUNED STRUCTURE OF OPTICAL, ELECTRICAL, AND/OR MAGNETIC CIRCUIT AND TUNING METHOD THEREOF

(71) Applicant: Advanced Chiplets Technology LTD., Hsinchu City (CN)

(72) Inventor: Chungmin Fu, Hsinchu City (CN)

(73) Assignee: Advanced Chiplets Technology LTD., Hsinchu City (CN)

( * ) Notice: Subject to any disclaimer, the term of this patent is extended or adjusted under 35 U.S.C. 154(b) by 0 days.

(21) Appl. No.: 19/232,840

(22) Filed: Jun. 9, 2025

(51) Int. Cl.
G06K 19/06 (2006.01)

(52) U.S. Cl.
CPC .............................. G06K 19/06037 (2013.01)

(58) Field of Classification Search
CPC .. G06K 19/06037; G06K 19/06; G06K 19/00; G06K 19/0779; G06K 19/07794; G06K 19/07767
USPC ............................ 235/494, 487, 462.07, 375
See application file for complete search history.

(56) References Cited

U.S. PATENT DOCUMENTS

| | | | |
|---|---|---|---|
| 2008/0200134 A1* | 8/2008 | Jongsma .............. | H04B 1/0458 455/127.1 |
| 2009/0027208 A1* | 1/2009 | Martin ............. | G06K 19/07749 340/572.5 |
| 2016/0006290 A1* | 1/2016 | Ho ........................... | H02J 7/731 320/108 |
| 2017/0018848 A1* | 1/2017 | Boutayeb ............. | H01Q 9/0407 |
| 2017/0054418 A1* | 2/2017 | Coumou ................. | H03F 3/245 |

* cited by examiner

*Primary Examiner* — Edwyn Labaze
(74) *Attorney, Agent, or Firm* — Justin Lampel

(57) ABSTRACT

Provided are a composite tuned structure of optical, electrical, and/or magnetic circuit and a tuning method thereof. The composite tuned structure of optical, electrical, and/or magnetic circuit includes a first tuned optical electromagnetic circuit layer, a second tuned circuit layer, and an optical electromagnetic circuit matching layer, where stacked tuning is performed on the first and second tuned circuit layers to form the optical electromagnetic circuit matching layer; an initial aligned state is obtained based on the optical electromagnetic circuit matching layer, and a target aligned state is preset; and if the initial aligned state of the optical electromagnetic circuit matching layer is the same as the target aligned state, matching between the first tuned optical electromagnetic circuit layer and the second tuned circuit layer is compliant, otherwise, the matching is not compliant. The present disclosure designs the tuned optical electromagnetic circuit as a composite layer.

8 Claims, 4 Drawing Sheets

COMPOSITE TUNED STRUCTURE OF OPTICAL, ELECTRICAL, AND/OR MAGNETIC CIRCUIT AND TUNING METHOD THEREOF

TECHNICAL FIELD

The present disclosure relates to the technical field of tuned circuits, and in particular to a composite tuned structure of optical, electrical, and/or magnetic circuit and a tuning method thereof.

BACKGROUND

Tuning in impedance matching of a radio-frequency (RF) circuit is crucial to design electronic devices. Particularly in wireless communication systems, radar, and signal processing, this technology is highly widespread. In brief, the core objective of this technology is to ensure signal transmission with minimum loss and maximum efficiency, while reducing interference from reflected waves to achieve ideal impedance between the signal source and the load. RF signals have very high frequencies, typically ranging from hundreds of megahertz (MHz) to thousands of MHz. For these signals, any small error may result in energy loss, excessive reflection, or even system instability. To realize accurate impedance matching among a current source, a transmission line and a receiving device is particularly important.

In case of impedance mismatching for components in the circuit, the signal transmission efficiency is greatly affected, or even the loss of signal (LOS) or interference is caused. During tuning, the analog-to-digital converter (ADC) controlled by a microprocessor unit (MPU) is configured to quantize a sampling parameter from a detection circuit into a digital signal. The digital signal is then read into a memory, and processed, thereby controlling a state of the matching network to realize impedance matching. The existing tuned circuit includes a single layer, with a complicated tuning process. There is a need to adjust a capacitor and an inductor in the circuit to realize tuned impedance matching. Therefore, how to provide a composite tuned circuit capable of realizing tuned impedance matching for different circuit structures is a technical problem to be solved by those skilled in the art urgently.

SUMMARY

In view of this, the present disclosure provides a composite tuned structure of optical, electrical, and/or magnetic circuit and a tuning method thereof, to solve the problem in the prior art.

To achieve the above objective, the present disclosure provides the following technical solutions:

According to a first aspect of the present disclosure, a composite tuned structure of optical, electrical, and/or magnetic circuit is provided, including a first tuned optical electromagnetic circuit layer, a second tuned circuit layer, and an optical electromagnetic circuit matching layer, where stacked tuning is performed on the first tuned optical electromagnetic circuit layer and the second tuned circuit layer to form the optical electromagnetic circuit matching layer; an initial aligned state is obtained based on the optical electromagnetic circuit matching layer, and a target aligned state is preset; and if the initial aligned state of the optical electromagnetic circuit matching layer is the same as the target aligned state, matching between the first tuned optical electromagnetic circuit layer and the second tuned circuit layer is compliant, otherwise, the matching is not compliant.

Further, the composite tuned structure of optical, electrical, and/or magnetic circuit is an optical path structure; when the composite tuned structure of optical, electrical, and/or magnetic circuit is the optical path structure, the first tuned optical electromagnetic circuit layer is a first tuned optical path layer, the second tuned circuit layer is a second tuned optical path layer, and the optical electromagnetic circuit matching layer is an optical path matching layer; and the first tuned optical path layer is a two-dimensional (2D) code bottom layer, the second tuned optical path layer is a 2D code top layer, and the optical path matching layer is an initial 2D code composite layer.

Further, the 2D code top layer is overlaid on the 2D code bottom layer to form the initial 2D code composite layer; and by comparing whether a 2D code grating image on the initial 2D code composite layer is the same as a preset target grating image, whether matching between the 2D code top layer and the 2D code bottom layer is compliant is determined.

Further, the composite tuned structure of optical, electrical, and/or magnetic circuit is a first inductive circuit structure; when the composite tuned structure of optical, electrical, and/or magnetic circuit is the first inductive circuit structure, the first tuned optical electromagnetic circuit layer is a first tuned inductive circuit layer, the second tuned circuit layer is a second tuned inductive circuit layer, and the optical electromagnetic circuit matching layer is an inductive circuit matching layer; and the first tuned inductive circuit layer is a first dielectric layer, the second tuned inductive circuit layer is a second dielectric layer, and the inductive circuit matching layer is a composite inductive circuit layer.

Further, the first dielectric layer and the second dielectric layer are cross-layered-connected to form the composite inductive circuit layer; and according to whether a current is detected on the composite inductive circuit layer, whether matching between the first dielectric layer and the second dielectric layer is compliant is determined.

Further, the composite tuned structure of optical, electrical, and/or magnetic circuit is a second inductive circuit structure; when the composite tuned structure of optical, electrical, and/or magnetic circuit is the second inductive circuit structure, the first tuned optical electromagnetic circuit layer is a first tuned inductive circuit layer, the second tuned circuit layer is a second tuned inductive circuit layer, and the optical electromagnetic circuit matching layer is an inductive circuit matching layer; and the first tuned inductive circuit layer is a first integrated inductive circuit array layer, the second tuned inductive circuit layer is a second integrated inductive circuit array layer, and the inductive circuit matching layer is a semiconductor package layer.

Further, the first integrated inductive circuit array layer and the second integrated inductive circuit array layer form the semiconductor package layer through electrical contact, non-contact or staged connection; and according to whether a functional parameter of the semiconductor package layer meets a preset parameter, whether matching between the first integrated inductive circuit array layer and the second integrated inductive circuit array layer is compliant is determined.

According to a second aspect of the present disclosure, a tuning method is provided, including the following steps:

step S1: performing the stacked tuning on the first tuned optical electromagnetic circuit layer and the second tuned circuit layer to form the optical electromagnetic circuit matching layer;

step S2: obtaining the initial aligned state based on the optical electromagnetic circuit matching layer, and presetting the target aligned state;

step S3: comparing the initial aligned state of the optical electromagnetic circuit matching layer with the target aligned state;

step S4: if the initial aligned state of the optical electromagnetic circuit matching layer is the same as the target aligned state, determining that the matching between the first tuned optical electromagnetic circuit layer and the second tuned circuit layer is compliant; and step S5: if the initial aligned state of the optical electromagnetic circuit matching layer is not the same as the target aligned state, determining that the matching between the first tuned optical electromagnetic circuit layer and the second tuned circuit layer is not compliant.

The present disclosure has the following advantages:

The composite tuned structure of optical, electrical, and/or magnetic circuit provided by the present disclosure includes the first tuned optical electromagnetic circuit layer, the second tuned circuit layer, and the optical electromagnetic circuit matching layer. The stacked tuning is performed on the first tuned optical electromagnetic circuit layer and the second tuned circuit layer to form the optical electromagnetic circuit matching layer. The initial aligned state is obtained based on the optical electromagnetic circuit matching layer, and the target aligned state is preset. If the initial aligned state of the optical electromagnetic circuit matching layer is the same as the target aligned state, the matching between the first tuned optical electromagnetic circuit layer and the second tuned circuit layer is compliant, otherwise, the matching is not compliant. The present disclosure designs the tuned optical electromagnetic circuit as a composite layer. By connecting each tuned optical electromagnetic circuit layer, the optical electromagnetic circuit matching layer is obtained. The tuned impedance matching is performed on the optical electromagnetic circuit through the aligned state of the optical electromagnetic circuit matching layer. The optical electromagnetic circuit is turned on only when the initial aligned state of the optical electromagnetic circuit matching layer is the same as the target aligned state. The present disclosure is safe and reliable in use, and simple and convenient in implementation.

BRIEF DESCRIPTION OF THE DRAWINGS

In order to explain the implementations of the present disclosure or the technical solutions in the prior art more clearly, the drawings that need to be used in the description of the implementations or the prior art will be briefly introduced below. Obviously, the drawings in the following description are only exemplary. For those of ordinary skill in the art, other implementation drawings can be derived from the provided drawings without creative work.

The structures, ratios and sizes shown in the specification are merely intended to match the content disclosed herein for the understanding and reading of those skilled in the art. They are not intended to limit the implementation conditions of the present disclosure, so they have no technical significance. Any modification to the structure, change in the proportional relationship or adjustment in the size should still fall within the scope of the technical content disclosed in the present disclosure without affecting the effects and objectives that can be achieved by the present disclosure.

In the figures.

101: first tuned optical electromagnetic circuit layer, 102: second tuned circuit layer, 103: optical electromagnetic circuit matching layer, 201: 2D code bottom layer, 202: 2D code top layer, 203: initial 2D code composite layer, 301: first dielectric layer, 302: second dielectric layer, 303: composite inductive circuit layer, 401: first integrated optical electromagnetic circuit array layer, 402: second integrated optical electromagnetic circuit array layer, and 403: semiconductor package layer.

DETAILED DESCRIPTION OF THE EMBODIMENTS

The implementations of the present disclosure will be illustrated below in conjunction with specific embodiments. Those skilled in the art can easily understand other advantages and effects of the present disclosure from the content disclosed in this specification. Obviously, the described embodiments are merely a part of, not all of, the embodiments of the present disclosure. All other embodiments obtained by those skilled in the art based on the embodiments of the present disclosure without creative efforts shall fall within the protection scope of the present disclosure.

Figures 1, 2:
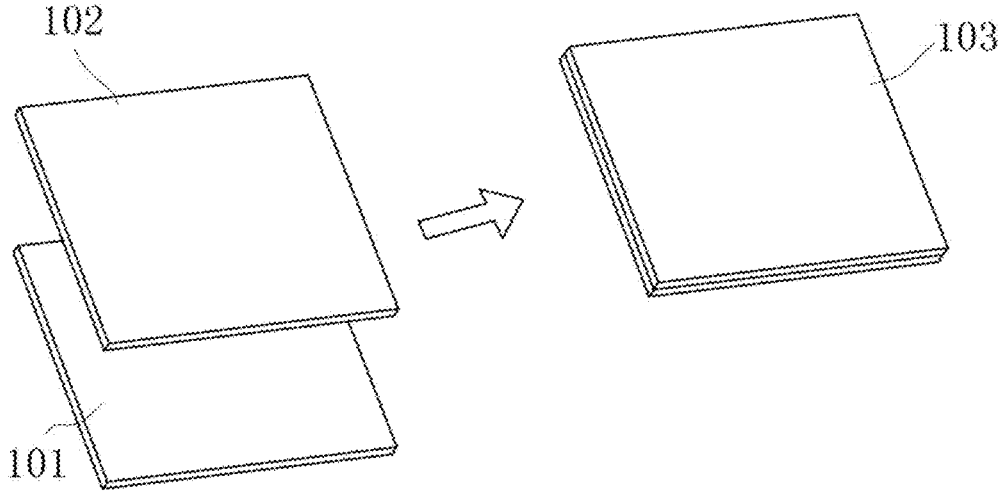
FIG. 1 is a structural view of a composite tuned structure of optical, electrical, and/or magnetic circuit according to the present disclosure.
FIG. 2 is a top view of an optical path structure according to Embodiment 1 of the present disclosure.

According to a first aspect of the present disclosure, as shown in FIG. 1, a composite tuned structure of optical, electrical, and/or magnetic circuit is provided, including a first tuned optical electromagnetic circuit layer 101, a second tuned circuit layer 102, and an optical electromagnetic circuit matching layer 103. Stacked tuning is performed on the first tuned optical electromagnetic circuit layer 101 and the second tuned circuit layer 102 to form the optical electromagnetic circuit matching layer 103. An initial aligned state is obtained based on the optical electromagnetic circuit matching layer 103, and a target aligned state is preset. If the initial aligned state of the optical electromagnetic circuit matching layer 103 is the same as the target aligned state, matching between the first tuned optical electromagnetic circuit layer 101 and the second tuned circuit layer 102 is compliant, otherwise, the matching is not compliant.

The present disclosure designs the tuned optical electromagnetic circuit as a composite layer. By connecting each tuned optical electromagnetic circuit layer, the optical electromagnetic circuit matching layer 103 is obtained. The tuned impedance matching is performed on the optical electromagnetic circuit through the aligned state of the optical electromagnetic circuit matching layer 103. The optical electromagnetic circuit is turned on only when the initial aligned state of the optical electromagnetic circuit matching layer 103 is the same as the target aligned state. The present disclosure is safe and reliable in use, and simple and convenient in implementation.

The composite tuned structure of optical, electrical, and/or magnetic circuit provided by the present disclosure can be applied to grating 2D codes, conductive dielectric layers and semiconductor packages. When the composite tuned structure of optical, electrical, and/or magnetic circuit provided by the present disclosure is applied to the grating 2D code, the composite tuned structure of optical, electrical, and/or magnetic circuit provided by the present disclosure enables the resulting 2D code composite layer to be verified conveniently. When the grating image on the 2D code composite layer is the same as the target image, it indicates that the 2D code composite layer is verified correctly and can realize signal reading. When the composite tuned structure of optical, electrical, and/or magnetic circuit provided by the present disclosure is applied to the conductive dielectric layer, the composite tuned structure of optical, electrical, and/or magnetic circuit provided by the present disclosure enables the resulting composite inductive circuit layer 303 to be verified conveniently. When a current flows through the composite inductive circuit layer 303, it indicates that the composite inductive circuit layer 303 is verified correctly and can realize signal reading. When the composite tuned structure of optical, electrical, and/or magnetic circuit provided by the present disclosure is applied to the semiconductor package, the composite tuned structure of optical, electrical, and/or magnetic circuit provided by the present disclosure enables the resulting semiconductor package to be verified conveniently. When the functional parameter on the semiconductor package is the same as the preset parameter, it indicates that the semiconductor package is verified correctly and can realize signal reading.

Embodiment 1

The composite tuned structure of circuit structure is at least an optical path structure. When the composite tuned optical circuit structure is the optical path structure, the first tuned optical electromagnetic circuit layer 101 is a first tuned optical path layer, the second tuned circuit layer 102 is a second tuned optical path layer, and the optical electromagnetic circuit matching layer 103 is an optical path matching layer. As shown in FIG. 2, the composite tuned optical structure is a plane structure. The first tuned optical path layer is a 2D code bottom layer 201. The second tuned optical path layer is a 2D code top layer 202. The optical path matching layer is an initial 2D code composite layer 203. The 2D code top layer 202 is overlaid on the 2D code bottom layer 201 to form the initial 2D code composite layer 203. By comparing whether a 2D code grating image on the initial 2D code composite layer 203 is the same as a preset target grating image, whether matching between the 2D code top layer 202 and the 2D code bottom layer 201 is compliant is determined.

The composite tuned optical path structure provided by the present disclosure enables the resulting 2D code composite layer to be verified conveniently. When the grating image on the 2D code composite layer is the same as the target image, it indicates that the 2D code composite layer is verified correctly and can realize signal reading.

Embodiment 2

Figure 3:
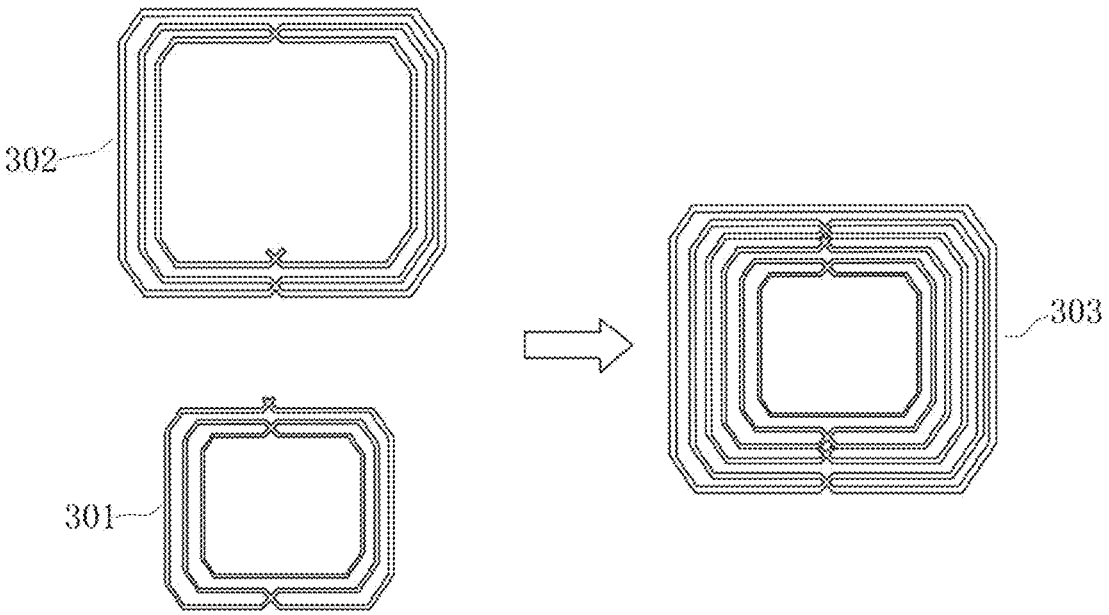
FIG. 3 is a top view of a first inductive circuit structure a according to Embodiment 2 of the present disclosure.
Figure 4:
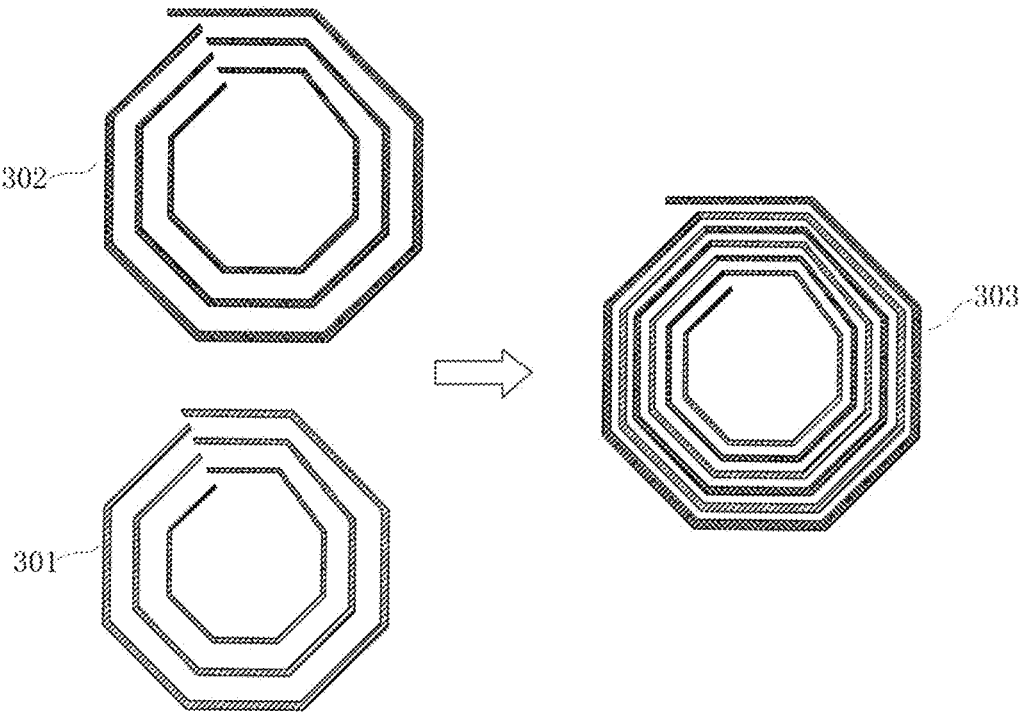
FIG. 4 is a top view of a first inductive circuit structure b according to Embodiment 2 of the present disclosure.

The composite tuned optical structure is further a first inductive circuit structure. When the composite tuned optical structure is the first inductive circuit structure, the first tuned optical electromagnetic circuit layer 101 is a first tuned inductive circuit layer, the second tuned circuit layer is a second tuned inductive circuit layer 102, and the optical electromagnetic circuit matching layer 103 is an inductive circuit matching layer. As shown in FIGS. 3-4, the composite tuned electrical circuit structure is a plane structure. The first tuned inductive circuit layer is a first dielectric layer 301. The second tuned inductive circuit layer is a second dielectric layer 302. The inductive circuit matching layer is a composite inductive circuit layer 303. The first dielectric layer 301 and the second dielectric layer 302 are cross-connected to form the composite inductive circuit layer 303. According to whether a current is detected at an intersection of the composite inductive circuit layer 303, whether matching between the first dielectric layer 301 and the second dielectric layer 302 is compliant is determined.

FIG. 3 shows a first inductive circuit structure a. The second dielectric layer 302 is an external three-turn circuit coil. The first dielectric layer 301 is an internal three-turn circuit coil. The composite inductive circuit layer 303 obtained by aligning the first dielectric layer 301 and the second dielectric layer 302 is a six-turn circuit coil. The external three-turn circuit coil and the internal three-turn circuit coil are connected electrically through a contact. When a current flows through the contact, it indicates that the composite inductive circuit layer 303 is verified correctly.

FIG. 4 shows a first inductive circuit structure b. The first dielectric layer 301 is an odd-turn circuit coil. The second dielectric layer 302 is an even-turn circuit coil. The composite inductive circuit layer 303 obtained by aligning the first dielectric layer 301 and the second dielectric layer 302 is an entire circuit coil. The odd-turn circuit coil and the even-turn circuit coil are connected electrically through a contact. When a current flows through the contact, it indicates that the composite inductive circuit layer 303 is verified correctly.

The composite tuned electrical circuit structure provided by the present disclosure enables the resulting composite inductive circuit layer 303 to be verified conveniently. When a current flows through the composite inductive circuit layer 303, it indicates that the composite inductive circuit layer 303 is verified correctly and can realize signal reading.

Embodiment 3

Figures 5, 6, 7:
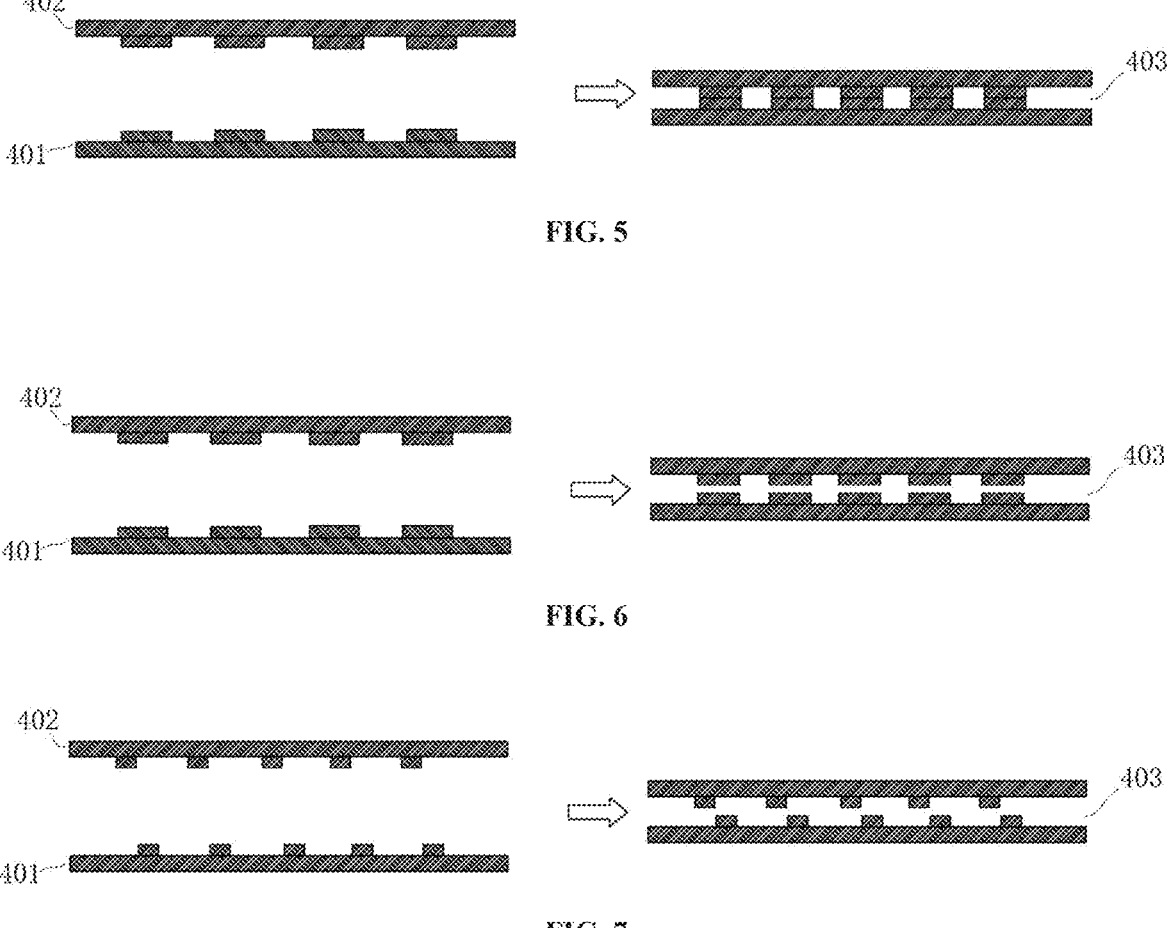
FIG. 5 is a cross-sectional view of a second inductive circuit structure in electrical contact connection according to Embodiment 3 of the present disclosure.
FIG. 6 is a cross-sectional view of a second inductive circuit structure in non-contact connection according to Embodiment 3 of the present disclosure.
FIG. 7 is a cross-sectional view of a second inductive circuit structure in misalignment offset according to Embodiment 3 of the present disclosure.

The composite tuned electrical circuit structure is further a second inductive circuit structure. When the composite tune electrical circuit structure is the second inductive circuit structure, the first tuned optical electromagnetic circuit layer 101 is a first tuned inductive circuit layer, the second tuned circuit layer is a second tuned inductive circuit layer 102, and the optical electromagnetic circuit matching layer 103 is an inductive circuit matching layer. As shown in FIG. 5-7, the composite tuned electrical circuit structure is a three-dimensional (3D) structure. The first tuned inductive circuit layer is a first integrated inductive circuit array layer 401. The second tuned inductive circuit layer is a second integrated inductive circuit array layer 402. The inductive circuit matching layer is a semiconductor package layer 403. Protrusions on the first integrated inductive circuit array layer 401 are an integrated circuit (IC) board structure. The IC board structure on the first integrated inductive circuit array layer 401 and an IC board structure on the second integrated inductive circuit array layer 402 form the semiconductor package layer 403 in electrical contact, non-contact (for induction/magnetism, etc.) or staggered (for optical penetration) connection. According to whether a functional parameter of the semiconductor package layer 403 meets a preset parameter, whether matching between the first integrated inductive circuit array layer 401 and the second integrated inductive circuit array layer 402 is compliant is determined. The composite tuned electrical circuit structure provided by the present disclosure enables the resulting semiconductor package to be verified conveniently. When the functional parameter on the semiconductor package is the same as the preset parameter, it indicates that the semiconductor package is verified correctly and can realize signal reading.

Figure 8:
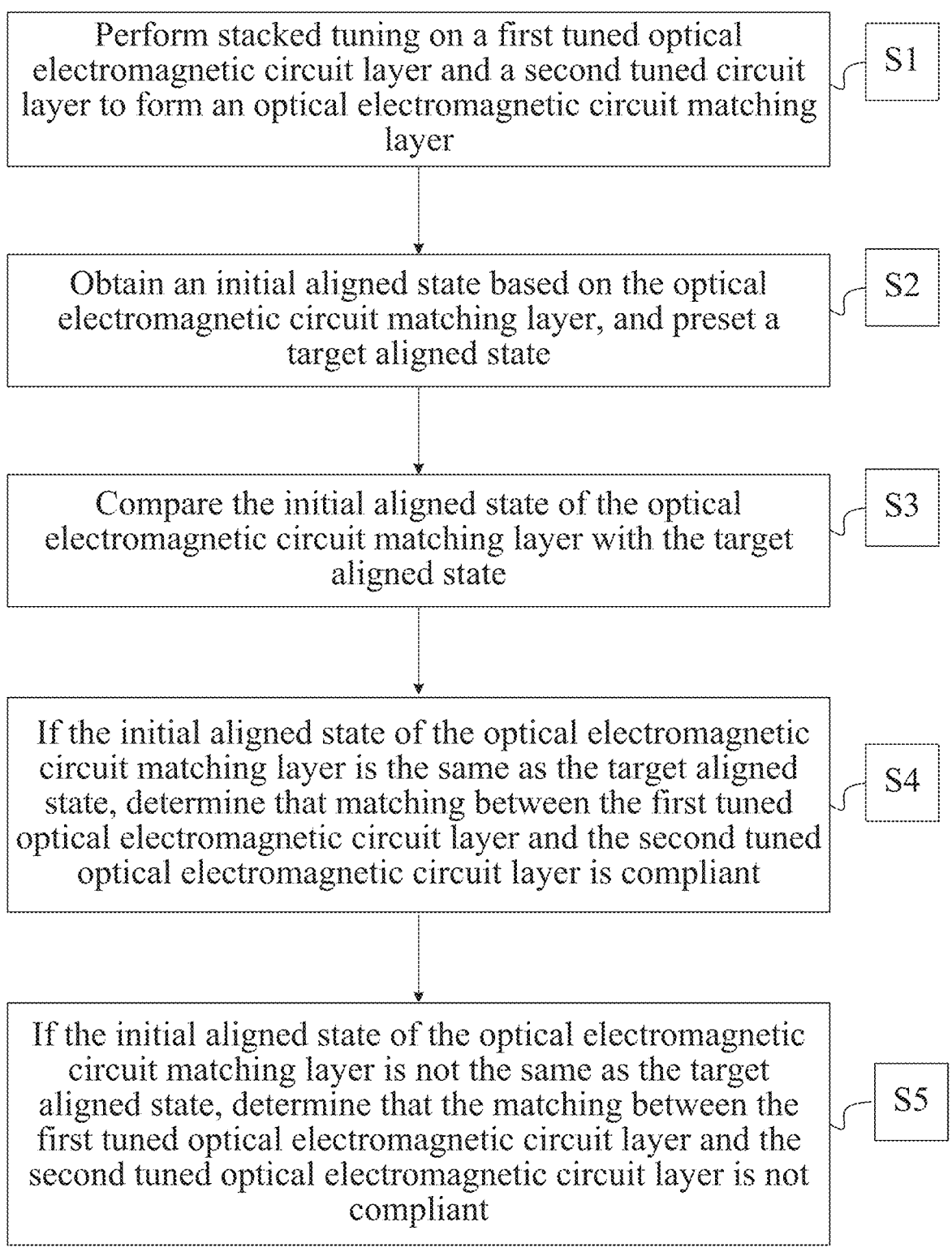
FIG. 8 is a flowchart of a tuning method according to the present disclosure.

According to a second aspect of the present disclosure, as shown in FIG. 8, a tuning method is provided, including the following steps:

Step S1: The stacked tuning is performed on the first tuned optical electromagnetic circuit layer 101 and the second tuned circuit layer 102 to form the optical electromagnetic circuit matching layer 103.

Step S2: The initial aligned state is obtained based on the optical electromagnetic circuit matching layer 103, and the target aligned state is preset.

Step S3: The initial aligned state of the optical electromagnetic circuit matching layer 103 is compared with the target aligned state.

Step S4: If the initial aligned state of the optical electromagnetic circuit matching layer 103 is the same as the target aligned state, it is determined that the matching between the first tuned optical electromagnetic circuit layer 101 and the second tuned circuit layer 102 is compliant.

Step S5: If the initial aligned state of the optical electromagnetic circuit matching layer 103 is not the same as the target aligned state, it is determined that the matching between the first tuned optical electromagnetic circuit layer 101 and the second tuned circuit layer 102 is not compliant.

The present disclosure designs the tuned optical electromagnetic circuit as a composite layer. By connecting each tuned optical electromagnetic circuit layer, the optical electromagnetic circuit matching layer 103 is obtained. The tuned impedance matching is performed on the optical electromagnetic circuit through the aligned state of the optical electromagnetic circuit matching layer 103. The optical electromagnetic circuit is turned on only when the initial aligned state of the optical electromagnetic circuit matching layer 103 is the same as the target aligned state. The present disclosure is safe and reliable in use, and simple and convenient in implementation.

Although the present disclosure has been described in detail above with general descriptions and specific embodiments, some modifications or improvements can be made on the basis of the present disclosure, which is apparent to those skilled in the art. Therefore, all of these modifications or improvements made without departing from the spirit of the present disclosure fall within the claimed scope of the present disclosure.

What is claimed is:

1. A composite tuned structure of optical, electrical, and/or magnetic circuit, comprising a first tuned optical electromagnetic circuit layer (101), a second tuned circuit layer (102), and an optical electromagnetic circuit matching layer (103), wherein stacked tuning is performed on the first tuned optical electromagnetic circuit layer (101) and the second tuned circuit layer (102) to form the optical electromagnetic circuit matching layer (103); an initial aligned state is obtained based on the optical electromagnetic circuit matching layer (103), and a target aligned state is preset; and if the initial aligned state of the optical electromagnetic circuit matching layer (103) is the same as the target aligned state, matching between the first tuned optical electromagnetic circuit layer (101) and the second tuned circuit layer (102) is compliant, otherwise, the matching is not compliant.

2. The composite tuned structure of optical, electrical, and/or magnetic circuit according to claim 1, wherein the composite tuned structure of optical, electrical, and/or magnetic circuit is an optical path structure; when the composite tuned structure of optical, electrical, and/or magnetic circuit is the optical path structure, the first tuned optical electromagnetic circuit layer (101) is a first tuned optical path layer, the second tuned circuit layer (102) is a second tuned optical path layer, and the optical electromagnetic circuit matching layer (103) is an optical path matching layer; and the first tuned optical path layer is a two-dimensional (2D) code bottom layer (201), the second tuned optical path layer is a 2D code top layer (202), and the optical path matching layer is an initial 2D code composite layer (203).

3. The composite tuned structure of optical, electrical, and/or magnetic circuit according to claim 2, wherein the 2D code top layer (202) is overlaid on the 2D code bottom layer (201) to form the initial 2D code composite layer (203); and by comparing whether a 2D code grating image on the initial 2D code composite layer (203) is the same as a preset target grating image, whether matching between the 2D code top layer (202) and the 2D code bottom layer (201) is compliant is determined.

4. The composite tuned structure of optical, electrical, and/or magnetic circuit according to claim 1, wherein the composite tuned structure of optical, electrical, and/or magnetic circuit is a first inductive circuit structure; when the composite tuned structure of optical, electrical, and/or magnetic circuit is the first inductive circuit structure, the first tuned optical electromagnetic circuit layer (101) is a first tuned inductive circuit layer, the second tuned circuit layer (102) is a second tuned inductive circuit layer, and the optical electromagnetic circuit matching layer (103) is an inductive circuit matching layer; and the first tuned inductive circuit layer is a first dielectric layer (301), the second tuned inductive circuit layer is a second dielectric layer (302), and the inductive circuit matching layer is a composite inductive circuit layer (303).

5. The composite tuned structure of optical, electrical, and/or magnetic circuit according to claim 4, wherein the first dielectric layer (301) and the second dielectric layer (302) are cross-connected to form the composite inductive circuit layer (303); and according to whether a current is detected on the composite inductive circuit layer (303), whether matching between the first dielectric layer (301) and the second dielectric layer (302) is compliant is determined.

6. The composite tuned structure of optical, electrical, and/or magnetic circuit according to claim 1, wherein the composite tuned structure of optical, electrical, and/or magnetic circuit is a second inductive circuit structure; when the composite tuned structure of optical, electrical, and/or magnetic circuit is the second inductive circuit structure, the first tuned optical electromagnetic circuit layer (101) is a first tuned inductive circuit layer, the second tuned circuit layer (102) is a second tuned inductive circuit layer, and the optical electromagnetic circuit matching layer (103) is an inductive circuit matching layer; and the first tuned inductive circuit layer is a first integrated inductive circuit array layer (401), the second tuned inductive circuit layer is a second integrated inductive circuit array layer (402), and the inductive circuit matching layer is a semiconductor package layer (403).

7. The composite tuned structure of optical, electrical, and/or magnetic circuit according to claim 6, wherein the first integrated inductive circuit array layer (401) and the second integrated inductive circuit array layer (402) form the semiconductor package layer (403) through electrical contact, non-contact or misalignment offset; and according to whether a functional parameter of the semiconductor package layer (403) meets a preset parameter, whether matching between the first integrated inductive circuit array layer (401) and the second integrated inductive circuit array layer (402) is compliant is determined.

8. A tuning method, applied to the composite tuned structure of optical, electrical, and/or magnetic circuit according to claim 1, and comprising the following steps:

step S1: performing the stacked tuning on the first tuned optical electromagnetic circuit layer (101) and the second tuned circuit layer (102) to form the optical electromagnetic circuit matching layer (103);

step S2: obtaining the initial aligned state based on the optical electromagnetic circuit matching layer (103), and presetting the target aligned state;

step S3: comparing the initial aligned state of the optical electromagnetic circuit matching layer (103) with the target aligned state;

step S4: if the initial aligned state of the optical electromagnetic circuit matching layer (103) is the same as the target aligned state, determining that the matching between the first tuned optical electromagnetic circuit layer (101) and the second tuned circuit layer (102) is compliant; and step S5: if the initial aligned state of the optical electromagnetic circuit matching layer (103) is not the same as the target aligned state, determining that the matching between the first tuned optical electromagnetic circuit layer (101) and the second tuned circuit layer (102) is not compliant.

* * * * *